Dec. 9, 1952  E. R. PRICE  2,620,674
FORCE TRANSMITTING MECHANISM
Filed Feb. 14, 1947  2 SHEETS—SHEET 1

INVENTOR.
EARL R. PRICE
BY
H. O. Clayton
ATTORNEY

Dec. 9, 1952          E. R. PRICE          2,620,674

FORCE TRANSMITTING MECHANISM

Filed Feb. 14, 1947          2 SHEETS—SHEET 2

INVENTOR.
EARL R. PRICE
BY
ATTORNEY

Patented Dec. 9, 1952

2,620,674

UNITED STATES PATENT OFFICE 2,620,674

FORCE TRANSMITTING MECHANISM

Earl R. Price, South Bend, Ind., assignor to Bendix Aviation Corporation, South Bend, Ind., a corporation of Delaware Application February 14, 1947, Serial No. 728,489

2 Claims. (Cl. 74—96)

This invention has to do with a force transmitting mechanism and is well adapted for use as a part of the transmission operating mechanism of an automotive vehicle, particularly a transmission operating mechanism of the type disclosed in Price application No. 642,240, filed January 19, 1946.

An object of my invention is to provide a reliable, compact and cheaply manufactured alternator, that is direction changing mechanism, adapted for use in a transmission operating mechanism.

Yet another object of my invention is to provide a simple and effective alternator mechanism including an input lever and an output lever and means interconnecting said levers whereby with successive angular rotations of the input lever in one direction there is effected a reciprocatory movement of the output lever; and another object of my invention is to so construct and arrange the parts of said mechanism that with successive angular movements of the input lever in the other direction there is effected a preselecting operation of the mechanism.

Other objects of the invention and desirable details of construction and combinations of parts will become apparent from the following description of a preferred embodiment of my invention, which description is taken in conjunction with the accompanying drawings, in which.

Figure 1:
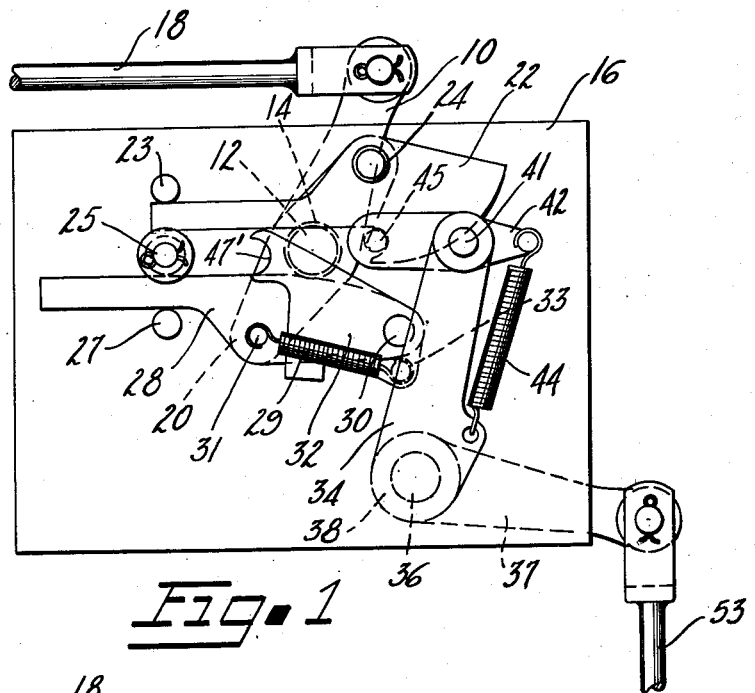
Figure 1 is a view disclosing the parts of the alternator mechanism constituting my invention, the output lever having been moved to one of its operative positions.

The four figures of the drawings disclose a preferred embodiment of my invention wherein a crank 10, which may be termed an output lever member, extends from and is secured to the outer end of a shaft 12. This shaft 12 is journalled within a sleeve 14 which is preferably permanently secured to a support plate 16. A link 18, pivotally connected to the outer end of the crank 10, is connected to the mechanism to be actuated, such for example, as a transmission operating crank of a change speed transmission mechanism of an automotive vehicle. The output lever member 10 is, by this construction, pivotally mounted on the support plate 16.

To the inner end of the shaft 12, that is the end lying just within the support plate 16, there is secured a two-armed crank or walking beam 20. To the end of the upper arm of the latter member there is pivotally connected a first alternator leg 22; and said leg and walking beam are preferably spaced apart by a washer 24.

To the lower end of the walking beam 20 there is pivotally connected a leg mount 28; and to said leg mount there is pivotally connected at 30 a leg member 32. A tension spring 29 interconnecting a pivot pin 31 and an arm portion 33 of leg member 32, serves to bias the latter member in a clockwise direction about the pivot 30. The leg members 22 and 32 preferably lie in the same or substantially the same plane. Leg mount 28 and the leg member 32 together constitute a second alternator leg, both the first alternator leg 22 and the second alternator leg serving as force transmitting means of the alternator mechanism. One end of the first alternator leg 22 extends between guide pins 23 and 25 mounted upon the support plate 16, and one end of the leg mount 28 extends between the guide pin 25 and a guide pin 27 the latter being also mounted in the support plate.

A crank 34, which may be termed an input lever member, is secured to the inner end of a shaft 36 and said shaft is preferably journalled within a bearing 38 which is preferably permanently secured to the support plate 16. A link 53 pivotally connected to the end of a crank 37, may be either manually or power operated depending upon the mechanism of which the alternator mechanism of my invention constitutes a part. The crank 37 is mounted on the outer end of the shaft 36. To the upper end of the lever member 34 there is pivotally connected at 41 a pawl 42. This pawl is preferably biased to rotate in a clockwise direction, by means of a tension spring 44 connected to the member 34; and a pin 45 extending laterally and inwardly from one end of the pawl, is adapted to nest within a recess 47 in the alternator leg 22.

Figure 2:
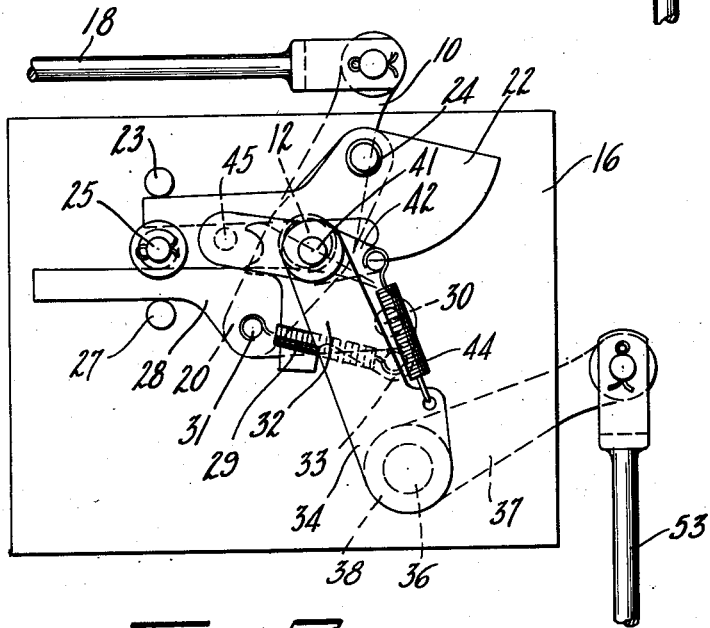
Figure 2 is another view of the parts of the alternator mechanism constituting my invention, the input lever having been moved from the position disclosed in Figure 1 to its position to preselect the next operation of the mechanism.
Figure 3:
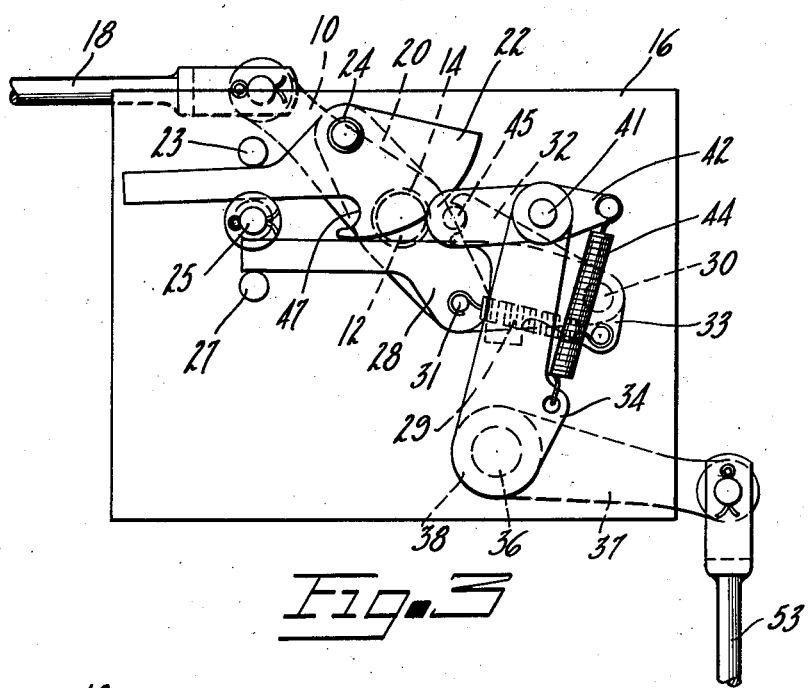
Figure 3 is a view disclosing the parts of the mechanism of my invention in the positions assumed after the output lever has been moved to its other operative position.

The output lever member 10 is disclosed in one of its two operative positions in Figure 1 and the sequence of operations of the alternator mechanism constituting my invention will now be described said description starting with the position of the parts of the mechanism disclosed in this figure. The input lever member 34 is first rotated counterclockwise to the position disclosed in Figure 2; and during this operation the pin 45 on the end of the pawl 42 is first biased against the lower edge of leg 22 and then strikes the upper edge of the leg member 32 rotating the latter counterclockwise about the pivot 30 and against the tension of the spring 29. At the end of this operation the parts of the mechanism take the positions disclosed in Figure 2 the leg member 32 snapping back in a clockwise direction by what may be termed a trigger operation, to the position disclosed in Figures 1 and 2. The pin 45 remains biased against the lower edge of the leg 22 by means of the operation of the spring 44. The mechanism is, by this preselecting operation, conditioned to subsequently effect the second setting of the output lever member 10; and the latter operation is effected by rotating the input member 34 clockwise, the parts of the mechanism being moved to the positions disclosed in Figure 3. In this operation the pin 45 is first moved to the right and into registry with the recess 47' in the leg member 32; and continued clockwise rotation of the input lever member 34 then effects a movement to the right of the two parts of the second alternator leg, said parts moving together as a unit. The latter operation serves to rotate the walking beam 20 counterclockwise thereby bodily moving the first alternator leg 22 to the left and effecting a counterclockwise rotation, that is operative movement, of the output lever member 10. The work, i. e., a transmission mechanism, connected to the link 18 is, by this operation, actuated to establish the second setting thereof, the first setting having been effected when the mechanism of my invention is operated to move the parts thereof to the positions disclosed in Figure 1.

Figure 4:
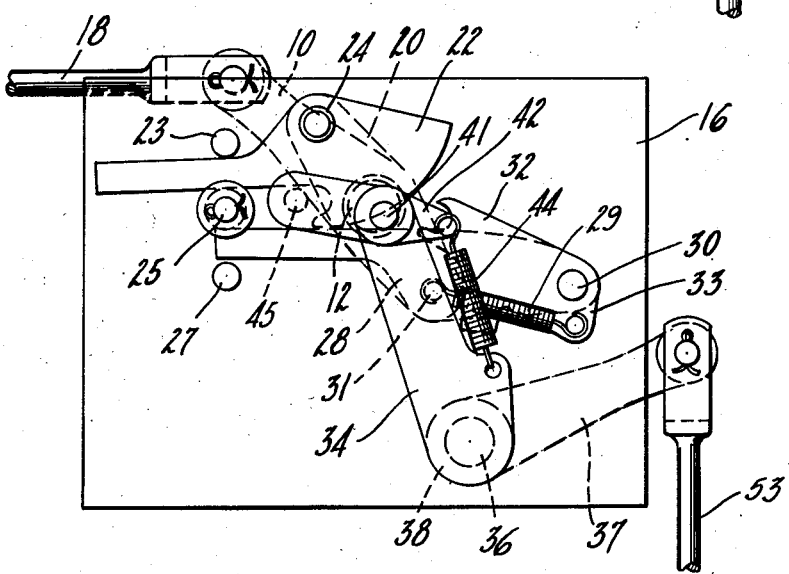
Figure 4 is another view of the parts of the alternator mechanism constituting my invention, the input lever having been again moved to effect its preselecting operation.

Concluding the description of the operation of the mechanism constituting my invention, to effect the second preselecting operation of the mechanism, that is prepare the mechanism for an operation to effect the aforementioned first setting of the output lever member 10, the input lever member 34 is again rotated counterclockwise; and with this operation the pin 45 moves along the curved lower edge of the alternator leg 22 until it reaches the end of said curved edge whereupon it is, by a trigger operation of the spring loaded pawl 42, snapped into a position immediately adjacent the recess 47. The parts of the mechanism are then in the positions disclosed in Figure 4 and the mechanism is ready for a subsequent clockwise rotation of the input lever member 34 to again effect the operation of the output lever member 10.

There is thus provided, by the compact mechanism disclosed in the four figures of the drawings, an alternator or direction changing mechanism well suited for use as a part of the transmission operating mechanism of an automotive vehicle, particularly a transmission operating mechanism including a single acting pressure differential operated motor operative to successively effect two different settings of the transmission.

Although this invention has been described in connection with a specific embodiment, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. An alternator mechanism including as a unit a support plate, an angularly movable input member rotatably mounted on said plate, an angularly movable output member rotatably mounted on said plate, a two-armed crank operably connected to said output member, a first alternator leg pivotally connected to one end of the two-armed crank, a two-part second alternator leg pivotally connected to the other end of the two-armed crank the parts of said leg being biased into an engagement with each other by a spring, and a spring loaded pawl member interconnecting the input member with one or the other of the leg members.

2. An alternator mechanism including as a unit a support plate, an input member pivotally mounted on said plate, an output member pivotally mounted on said plate, a walking beam operatively connected to the output member, guide means mounted on the support plate, a first alternator leg pivotally connected to one end of the walking beam and having one of its ends extending between certain of the guide means, a two-part second alternator leg pivotally connected to the other end of the walking beam and having one of its ends extending between certain of the guide means, and means operably connected to the input member and alternately connected first with one alternator leg and then the other and operable, with an operation of the input member, to effect a reciprocatory angular movement of the walking beam and the output member connected thereto.

EARL R. PRICE.

REFERENCES CITED

The following references are of record in the file of this patent:

UNITED STATES PATENTS

| Number | Name | Date |
| --- | --- | --- |
| 501,880 | Frasee | July 18, 1893 |
| 1,773,216 | Campbell | Aug. 19, 1930 |
| 1,864,103 | Tenbrook | June 21, 1932 |
| 2,169,822 | Taylor | Aug. 15, 1939 |
| 2,208,384 | Morrison | July 16, 1940 |
| 2,208,828 | Adams | July 23, 1940 |

FOREIGN PATENTS

| Number | Country | Date |
| --- | --- | --- |
| 387,311 | Great Britain | Apr. 27, 1931 |